(12) United States Patent
Dai

(10) Patent No.: US 12,539,453 B2
(45) Date of Patent: Feb. 3, 2026

(54) GOLF CART CAPABLE OF CARRYING MULTIPLE GOLF BAGS

(71) Applicant: Xiamen Dalle New Energy Automobile Co., Ltd., Xiamen (CN)

(72) Inventor: Side Dai, Xiamen (CN)

(73) Assignee: Xiamen Dalle New Energy Automobile Co., Ltd., Xiamen (CN)

( * ) Notice: Subject to any disclaimer, the term of this patent is extended or adjusted under 35 U.S.C. 154(b) by 10 days.

(21) Appl. No.: 18/773,644

(22) Filed: Jul. 16, 2024

(65) Prior Publication Data
US 2025/0249323 A1 Aug. 7, 2025

(30) Foreign Application Priority Data
Feb. 5, 2024 (CN) .......................... 202420280474.5

(51) Int. Cl.
*B60R 9/08* (2006.01)
*A63B 55/00* (2015.01)
*A63B 55/60* (2015.01)

(52) U.S. Cl.
CPC ............ *A63B 55/60* (2015.10); *A63B 55/408* (2015.10)

(58) Field of Classification Search
CPC ....... B60R 9/08; B60R 9/06; B60R 2011/004; A63B 55/61; A63B 55/60; A63B 55/00; B60Y 2200/86
USPC ................................ 224/274, 281; 296/26.09
See application file for complete search history.

(56) References Cited

U.S. PATENT DOCUMENTS

| 4,533,013 | A | * | 8/1985 | Hightower | B62K 5/027 280/DIG. 5 |
| 5,052,604 | A | * | 10/1991 | Tourangeau | B62J 11/00 224/493 |
| 5,806,738 | A | * | 9/1998 | D'Angelo | B60R 9/06 224/521 |
| 6,554,171 | B1 | * | 4/2003 | Ewing, III | B60R 9/08 224/521 |
| 7,229,082 | B1 | * | 6/2007 | Wilmarth | B62B 5/0083 280/DIG. 6 |
| 2007/0051763 | A1 | * | 3/2007 | Adrian | B60R 11/00 224/568 |

* cited by examiner

Primary Examiner — Adam J Waggenspack
(74) Attorney, Agent, or Firm — Bayramoglu Law Offices LLC

(57) ABSTRACT

A golf cart capable of carrying multiple golf bags is provided, where a golf bag holder and a golf bag attachment are arranged at a rear of the golf cart, and a middle of the golf bag attachment is provided with a slot; one end of an extension rod is inserted into the slot, and the other end of the extension rod is provided with an extended golf bag attachment; the golf bag holder includes a fixed holder and a movable holder; sliding tracks are respectively arranged at two sides of the movable holder; and fixed ends of the sliding tracks are respectively located at two ends of the fixed holder. In the above solution, the golf cart adds the movable holder to the sliding tracks such that the movable holder can be stored above the fixed holder without occupying space. The golf cart features fewer components and simple operation.

2 Claims, 1 Drawing Sheet

GOLF CART CAPABLE OF CARRYING MULTIPLE GOLF BAGS

CROSS REFERENCE TO THE RELATED APPLICATIONS

This application is based upon and claims priority to Chinese Patent Application No. 202420280474.5, filed on Feb. 5, 2024, the entire contents of which are incorporated herein by reference.

TECHNICAL FIELD

The present disclosure relates to golf carts, and in particular to a golf cart with a golf bag holder.

BACKGROUND

As shown in FIG. 1, a rear of an existing golf cart is provided with a golf bag holder 1', and a golf bag attachment 2 is provided above the rear of the golf cart. It has been a conventional design to place two golf bags at the rear of an early golf cart with two or four seats. Later, a six-seat golf cart emerged, which could carry more golfers but could not also carry their golf bags. One more golf cart was needed to carry golf bags, but this was not convenient.

Chinese Patent Application CN203043463U provides a golf cart, including a standing board chassis and a golf bag placement platform provided at the rear of the golf cart. The standing board chassis is connected to the golf bag placement platform, and a standing board cushion is provided on the standing board chassis. The standing board chassis is connected to at least one extended golf bag placement platform. This solution involves too many components, which may be lost after being removed at idle times.

SUMMARY

The present disclosure relates to a golf cart capable of carrying multiple golf bags, featuring fewer components and convenient mounting.

In order to achieve the above objective, the present disclosure provides a golf cart capable of carrying multiple golf bags, where a golf bag holder and a golf bag attachment are arranged at a rear of the golf cart, and a middle of the golf bag attachment is provided with a slot; one end of an extension rod is inserted into the slot, and the other end of the extension rod is provided with an extended golf bag attachment; each of the two golf bag attachments is provided with a golf bag strap; the golf bag holder includes a fixed holder and a movable holder; sliding tracks are respectively arranged at two sides of the movable holder; and fixed ends of the sliding tracks are respectively located at two ends of the fixed holder.

Each of the fixed holder and the movable holder includes two golf bag positions; each of the golf bag positions is provided with a receptacle fitted to a bottom of a golf bag; and each of the golf bag attachment and the extended golf bag attachment includes two golf bag straps.

In the above solution, the present disclosure adds the movable holder to the sliding tracks such that the movable holder can be stored above the fixed holder without occupying space. The present disclosure features fewer components and simple operation.

REFERENCE NUMERALS

1'. holder; 11. movable holder; 111. movable holder golf bag receptacle; 12. fixed holder; 121. holder golf bag receptacle; 13. sliding track; 2. golf bag attachment; 2a. fixed golf bag attachment; 21. slot; 2b. extended golf bag attachment; 21b. golf bag strap; and 3. extension rod.

DETAILED DESCRIPTION OF THE EMBODIMENTS

For detailed description of the technical contents, technical features, objectives, and effects of the present disclosure, the present disclosure is described below with reference to implementations and drawings.

Figure 1:
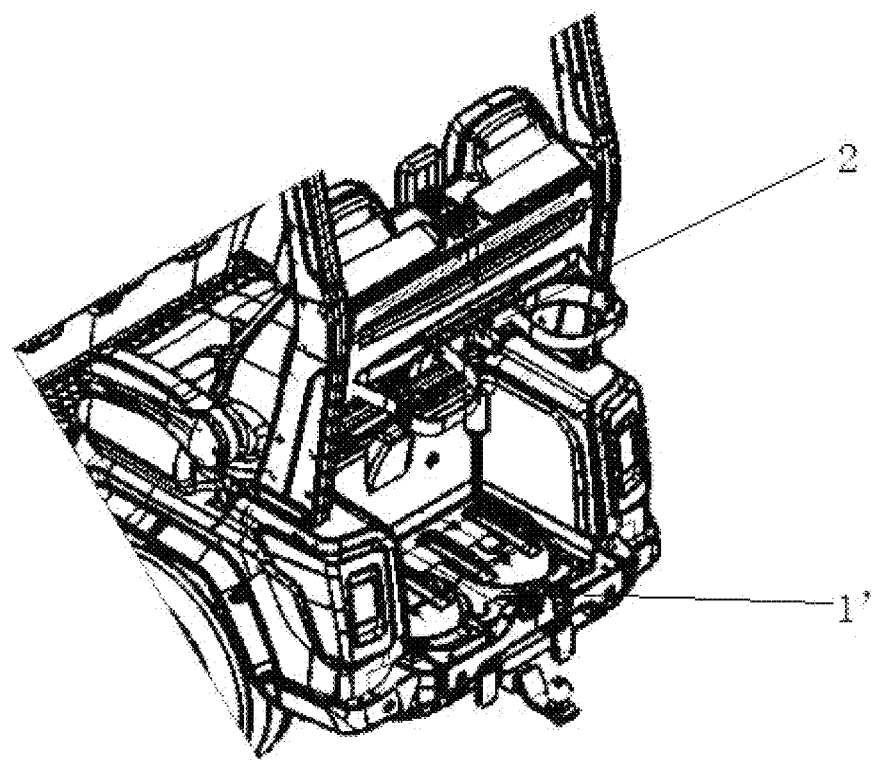
FIG. 1 is a structural diagram of an existing technical solution.
Figure 2:
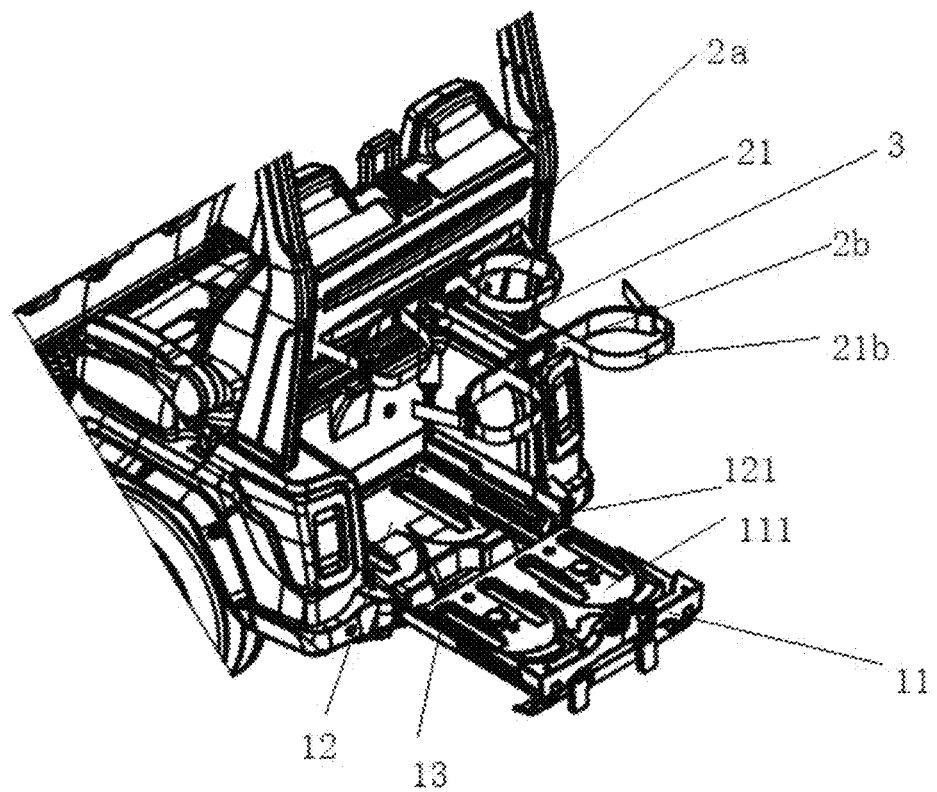
FIG. 2 is a structural diagram of a golf cart capable of carrying multiple golf bags according to the present disclosure.

As shown in FIG. 2, the present disclosure provides a golf cart capable of carrying multiple golf bags, and a golf bag holder and fixed golf bag attachment 2a are arranged at a rear of the golf cart. A middle of the fixed golf bag attachment 2a is provided with slot 21. One end of extension rod 3 is inserted into the slot 21. The extension rod can be bolted into the slot 21 by a bolt. The other end of the extension rod 3 is provided with extended golf bag attachment 2b. Each of the two golf bag attachments is provided with two golf bag straps 21b. The golf bag holder includes fixed holder 12 and movable holder 11. Each of the fixed holder 12 and the movable holder 11 includes two golf bag positions. Each of the golf bag positions is provided with receptacles 111 and 121 that are fitted to a bottom of a golf bag (not shown in the figure) to prevent the bottom of the golf bag from slipping. Sliding tracks 13 are respectively arranged at two sides of the movable holder 11. Fixed ends of the sliding tracks 13 are respectively located at two ends of the fixed holder 12. A sliding track switch (not shown in the figure) is provided at a front end of the movable holder 11. The sliding tracks is a well-known structure.

When in use, if there are 1-2 golfers, 1-2 golf bags can be placed without the need to pull out the movable holder or insert the extended golf bag attachment 2b. When there are 3-4 golfers, the movable holder 11 is pulled out, the extended golf bag attachment 2b is inserted, and the extension rod 3 is bolted. First, golf bags are placed on the fixed holder 12 and secured tightly with the golf bag straps. Then, the other golf bags are placed on the movable holder 11 and secured tightly with the golf bag straps 21b on the extended golf bag attachment 2b.

The above described are merely embodiments of the present disclosure, which are not intended to limit the scope of patent protection of the present disclosure. Any equivalent structure or structural transformation made based on the specification and drawings of the present disclosure, or direct or indirect application of the present disclosure in other related technical fields, should fall within the scope of patent protection of the present disclosure.

What is claimed is:

1. A golf cart configured for carrying a plurality of golf bags, wherein a golf bag holder and a golf bag attachment are arranged at a rear of the golf cart, and a middle of the golf bag attachment is provided with a slot; a first end of an extension rod is inserted into the slot, and a second end of the extension rod is provided with an extended golf bag attachment; each of the golf bag attachment and the extended golf bag attachment is provided with a golf bag strap; the golf bag holder comprises a fixed holder and a movable holder;

a pair of sliding tracks are disposed at opposing sides of the movable holder, wherein proximal ends of the pair of sliding tracks are rigidly secured to corresponding ends of the fixed holder, and distal ends of the pair of sliding tracks are coupled to the movable holder, such that the movable holder is slidable between a stowed position above the fixed holder and an extended position for receiving golf bags, and wherein a pair of guide rails are disposed at the opposing sides of the movable holder, wherein lower ends of the pair of guide rails are fixed to corresponding ends of the fixed holder, and upper ends of the pair of guide rails are coupled to the movable holder, such that the movable holder is slidable along the pair of guide rails between a stowed position directly above the fixed holder and an extended position for receiving golf bags, whereby the movable holder is stacked above the fixed holder when not in use and does not increase the rear overhang of the cart, and when the movable holder is in an extended position, the fixed holder and the golf bag attachment with the strap are configured to cooperate to secure a first golf bag in a secured position on the fixed holder, and the movable holder and the extended attach golf bag attachment with its strap are configured to cooperate to secure a second golf bag in a position on the movable holder.

2. The golf cart configured for carrying the plurality of golf bags according to claim 1, wherein each of the fixed holder and the movable holder comprises two golf bag positions; each of the golf bag positions is provided with a receptacle fitted to a bottom of each of the plurality of golf bags; and a number of the golf bag strap is two.

* * * * *